US011345213B2

(12) United States Patent
Yoon

(10) Patent No.: US 11,345,213 B2
(45) Date of Patent: May 31, 2022

(54) SEAT HEATING SYSTEM FOR VEHICLE

(71) Applicants:HYUNDAI MOTOR COMPANY, Seoul (KR); KIA MOTORS CORPORATION, Seoul (KR)

(72) Inventor: Hyun-Woo Yoon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 27 days.

(21) Appl. No.: 17/144,392

(22) Filed: Jan. 8, 2021

(65) Prior Publication Data

US 2022/0032734 A1 Feb. 3, 2022

(30) Foreign Application Priority Data

Aug. 3, 2020 (KR) .......................... 10-2020-0096839

(51) Int. Cl.
*B60H 1/20* (2006.01)
*B60N 2/56* (2006.01)

(52) U.S. Cl.
CPC .............. *B60H 1/20* (2013.01); *B60N 2/5621* (2013.01)

(58) Field of Classification Search
CPC ................................ B60H 1/20; B60N 2/5621
See application file for complete search history.

(56) References Cited

U.S. PATENT DOCUMENTS

| 1,860,752 | A | * | 5/1932 | Sawyer | ..................... | B60N 2/56 |
| | | | | | | 5/421 |
| 5,138,851 | A | * | 8/1992 | Mardikian | ........... | B60N 2/5614 |
| | | | | | | 62/434 |
| 11,225,890 | B2 | * | 1/2022 | Yang | ..................... | G10K 11/161 |
| 2006/0059933 | A1 | * | 3/2006 | Axakov | .................. | F25B 15/04 |
| | | | | | | 62/476 |
| 2019/0061574 | A1 | * | 2/2019 | Schwintek | ................. | B62J 1/12 |
| 2020/0376988 | A1 | * | 12/2020 | Cha | .......................... | B60N 2/22 |
| 2021/0039476 | A1 | * | 2/2021 | Suzuki | ................. | B60H 1/3205 |
| 2022/0032733 | A1 | * | 2/2022 | Spangler | .................. | B60K 6/24 |

FOREIGN PATENT DOCUMENTS

KR 20-1998-0027194 U 8/1998

* cited by examiner

*Primary Examiner* — David R Dunn
*Assistant Examiner* — Tania Abraham
(74) *Attorney, Agent, or Firm* — Morgan, Lewis & Bockius LLP

(57) ABSTRACT

The present disclosure provides a seat heating system for a vehicle including: an exhaust gas inlet tube having one end communicating with a silencer hole formed in a muffler silencer, and the other end mounted on a vehicle body in a front and rear direction of a vehicle and connected to a seat rail coupled to a seat and an exhaust gas outlet tube having one end communicating with a muffler pipe of the rear end of the muffler silencer, and the other end connected to the seat rail, and the present disclosure may not require a seat interior hot wire of a vehicle, and implement a heating function using the waste heat of exhaust gas to heat the seat.

18 Claims, 14 Drawing Sheets

SEAT HEATING SYSTEM FOR VEHICLE

CROSS-REFERENCE TO RELATED APPLICATION

This application claims priority to Korean Patent Application No. 10-2020-0096839, filed on Aug. 3, 2020, which is incorporated herein by reference in its entirety.

TECHNICAL FIELD

The present disclosure relates to a system capable of providing heating to a seat for a vehicle.

BACKGROUND

In order to provide heating to a seat for a vehicle, a hot wire is conventionally installed inside the seat and operated so that heat is generated by the hot wire.

However, the hot wire has disadvantages as well as advantages.

First, power is required to be supplied upon operation of the hot wire, thereby causing loss of fuel efficiency, and an additional device such as a hot wire for a seat heating function is needed.

Second, since the seat is required to prevent fire due to heat, and to have no deformation and change in a physical property due to heat, a material for seat requiring heat resistance is required to be adopted.

Third, since the direct contact between the seat having the hot wire embedded therein and the customer is inevitable, there is a risk of burns if the user's naked skin is in contact with the seat.

In order to compensate for these disadvantages, Korean Utility Model Publication No. 20-1998-0027194 or the like proposes a heating system using an exhaust heat of a vehicle.

However, the related art is required to adopt a separate water tank, so that there is a disadvantage in that a space of a vehicle is largely limited, and there is a limit in that it is impossible to adjust the intensity of heating.

The contents described in Description of Related Art are to help the understanding of the background of the present disclosure, and may include what is not previously known to those skilled in the art to which the present disclosure pertains.

SUMMARY OF THE DISCLOSURE

The present disclosure is intended to solve the above problems, and an object of the present disclosure is to provide a seat heating system for a vehicle, which may not require a hot wire inside a seat for a vehicle, and implement a heating function using the waste heat of an exhaust gas to heat a vehicle seat.

A seat heating system for a vehicle according to an aspect of the present disclosure includes: an exhaust gas inlet tube having one end communicating with a silencer hole formed in a muffler silencer, and the other end mounted on a vehicle body and connected to a first seat rail coupled to a seat and an exhaust gas outlet tube having one end communicating with a muffler pipe of the rear end of the muffler silencer, and the other end connected to the first seat rail.

Here, the seat rail may have a hollow structure.

In addition, the seat heating system may further include a second seat rail, and a heat exchanging tube for connecting the first and second seat rails.

At this time, a plurality of heat exchanging tubes may be configured, and the openings and closings of the plurality of heat exchanging tubes may be individually controlled.

More specifically, the seat heating system for a vehicle may further include: a rotational plate mounted on the muffler silencer, and the one end of the exhaust gas inlet tube may be coupled through a rotational plate hole formed in the rotational plate to communicate with the silencer hole.

In addition, a degree of the communication between the exhaust gas inlet tube and the silence hole may be adjusted by a rotational operation of the rotational plate.

In addition, the seat heating system for a vehicle may further include: an actuator motor mounted on the muffler silencer and a power transfer part for transferring power by an operation of the actuator motor to the rotational plate.

In addition, the power transfer part may include: a rod connected to the actuator motor and a gear coupled to an end of the rod, and the rotational plate may be provided with a rotational plate gear engaged with the gear.

Meanwhile, the exhaust gas inlet tube and the exhaust gas outlet tube may be partially provided with wrinkle tubes.

The other end of the exhaust gas inlet tube may be mounted on the vehicle body in a front and rear direction of the vehicle.

Next, a seat heating system for a vehicle according to another aspect of the present disclosure may include: an exhaust gas inlet tube having one end communicating with a silencer hole in a muffler silencer, and the other end mounted on a vehicle body and connected to a first seat rail coupled to a seat; an exhaust gas outlet tube having one end communicating with a muffler pipe of a rear end of the muffler silencer, and the other end connected to the seat rail; and a heating adjustment structure for adjusting a degree of the communication between the exhaust gas inlet tube and the silencer hole.

Here, the heating adjustment structure may include: an actuator motor mounted on the muffler silencer, a rotational plate mounted on the muffler silencer, and a power transfer part for transferring power by an operation of the actuator motor to the rotational plate.

In addition, the one end of the exhaust gas inlet tube may be coupled through a rotational plate hole in the rotational plate to communicate with the silencer hole, and the degree of the communication between the exhaust gas inlet tube and the silencer hole may be adjusted by a rotational operation of the rotational plate.

Furthermore, the power transfer part may include: a rod connected to the actuator motor and a gear coupled to an end of the rod, and the rotational plate may be provided with a rotational plate gear engaged with the gear.

Furthermore, the seat heating system may further include a second seat rail and a heat exchanging tube for connecting the first and second seat rails, and a plurality of heat exchanging tubes may be configured.

The other end of the exhaust gas inlet tube may be mounted on the vehicle body in a front and rear direction of a vehicle.

As in the conventional technology, the power may be inevitably required to be supplied upon operation of the hot wire seat, thereby causing loss of fuel efficiency, but the present disclosure implements the heating function using the waste exhaust heat, thereby improving fuel efficiency compared to the conventional technology.

In addition, the adoption of the hot wire and related components for the seat interior heating is unnecessary, thereby saving the cost by removing the components.

In addition, since the conventional seat having the hot wire embedded therein is required to prevent fire from occurring in the seat portion by heat, and to have no deformation and change in the physical property of the seat due to the heat, the seat having the material with excellent heat resistance is required to be adopted, but the present disclosure which uses the exhaust heat to increase the temperature of the seat rail, and performs the heating function by the heat dissipation of the seat rail may adopt the seat material irrelevant to heat resistance, thereby saving the cost.

In addition, since the seat rail in the vehicle package is not in direct contact with the customer, there is no risk of burns.

Therefore, the present disclosure may be adopted for all vehicles regardless of the vehicle class or concept, and may largely save the manufacturing cost.

BRIEF DESCRIPTION OF THE DRAWINGS

FIGS. 7A to 7C are diagrams illustrating an exhaust gas circulation path of the seat heating system according to the present disclosure, in which FIG. 7A illustrates a side surface shape, FIG. 7B illustrates a rear surface shape, and FIG. 7C illustrates an upper surface shape.

DESCRIPTION OF SPECIFIC EMBODIMENTS

In order to fully understand the present disclosure, operational advantages of the present disclosure, and objects achieved by the implementation of the present disclosure, reference should be made to the accompanying drawings illustrating preferred exemplary embodiments of the present disclosure and the contents described in the accompanying drawings.

In describing the preferred exemplary embodiments of the present disclosure, the descriptions of known technologies or repetitive descriptions which may unnecessarily obscure the gist of the present disclosure will be reduced or omitted.

Figure 1:
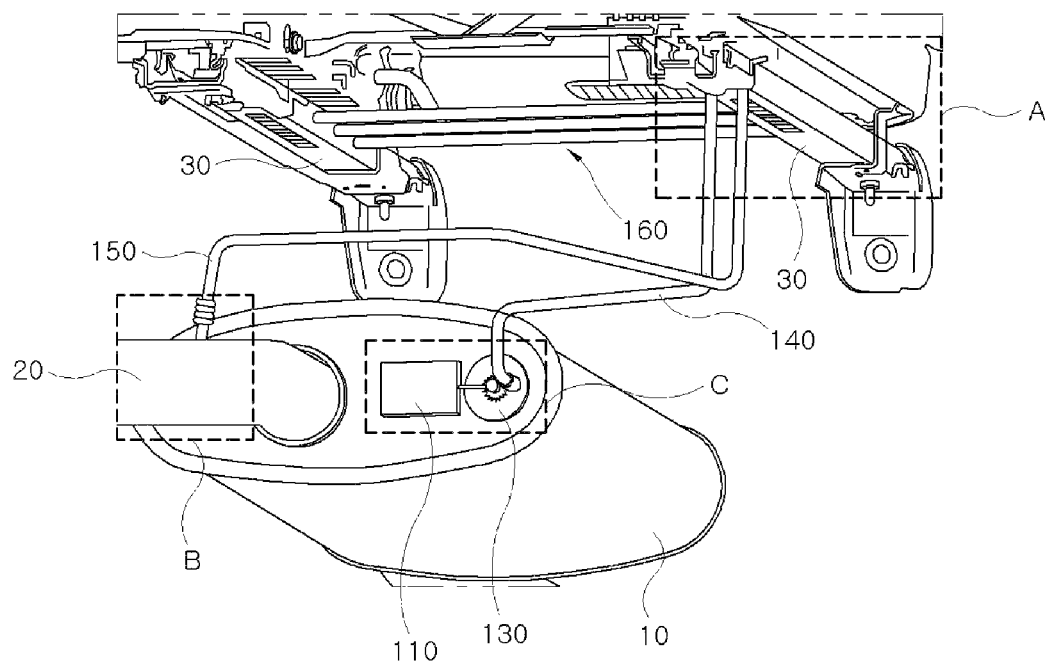
FIG. 1 is a diagram schematically illustrating a seat heating system for a vehicle according to the present disclosure.

FIG. 1 is a diagram schematically illustrating a seat heating system for a vehicle according to the present disclosure.

Figure 2A:
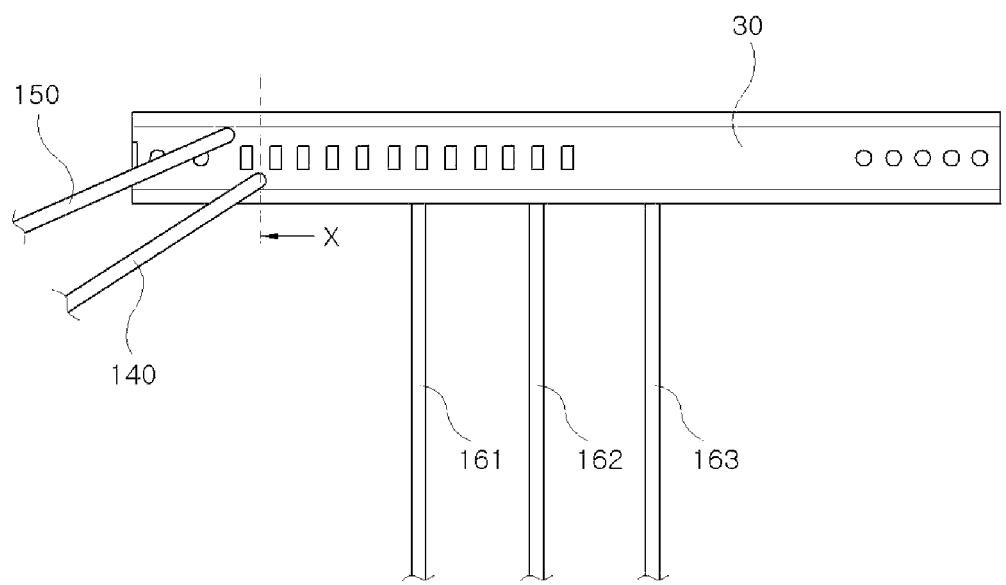
FIG. 2A is an enlarged diagram illustrating a portion A illustrated in FIG. 1.
Figure 2B:
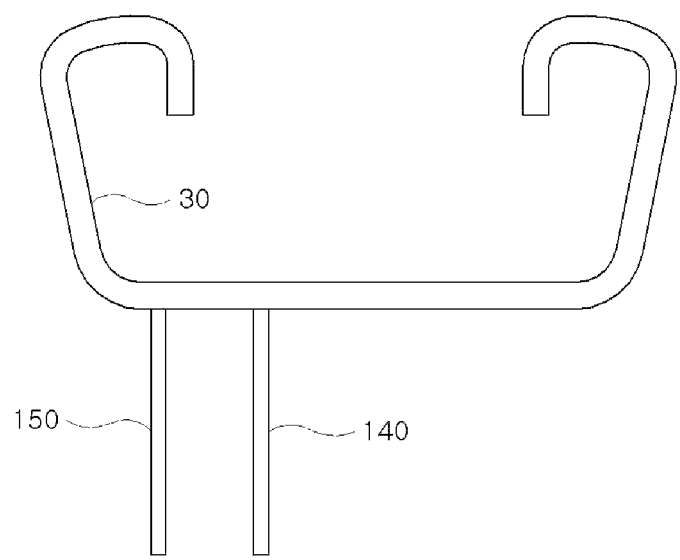
FIG. 2B is a diagram illustrating a cross-sectional shape viewed from X illustrated in FIG. 2A.
Figure 3:
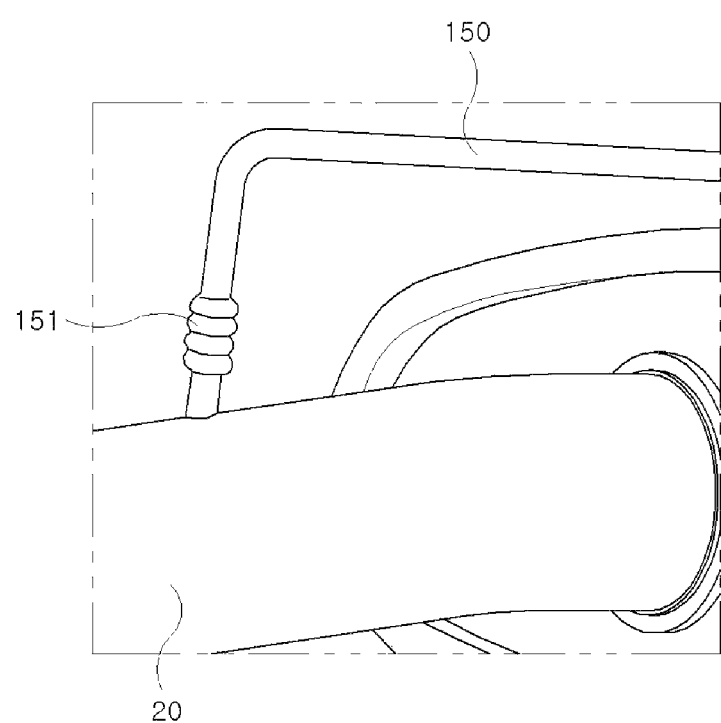
FIG. 3 is an enlarged diagram illustrating a portion B illustrated in FIG. 1.
Figure 4A:
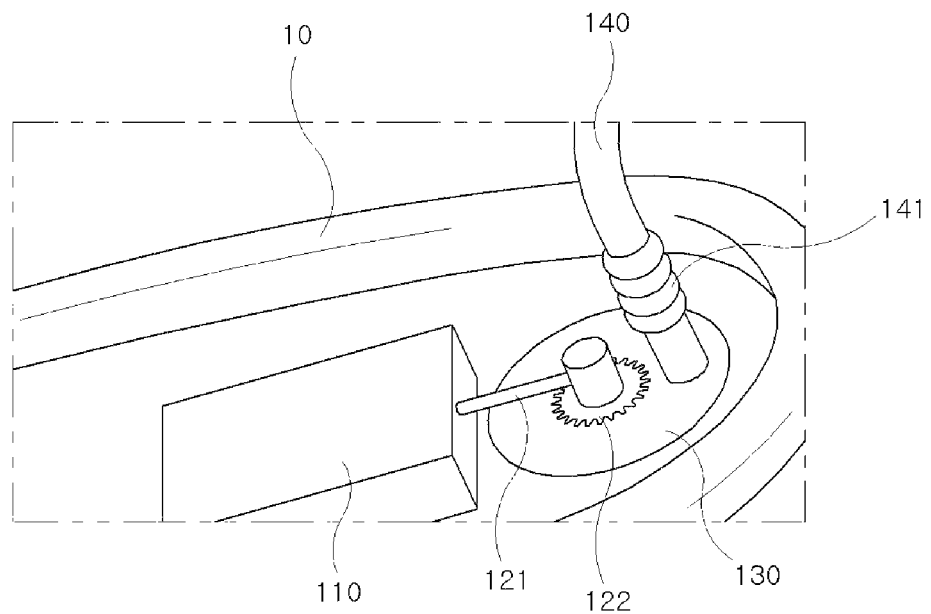
FIG. 4A is an enlarged diagram illustrating a portion C illustrated in FIG. 1.
Figure 4B:
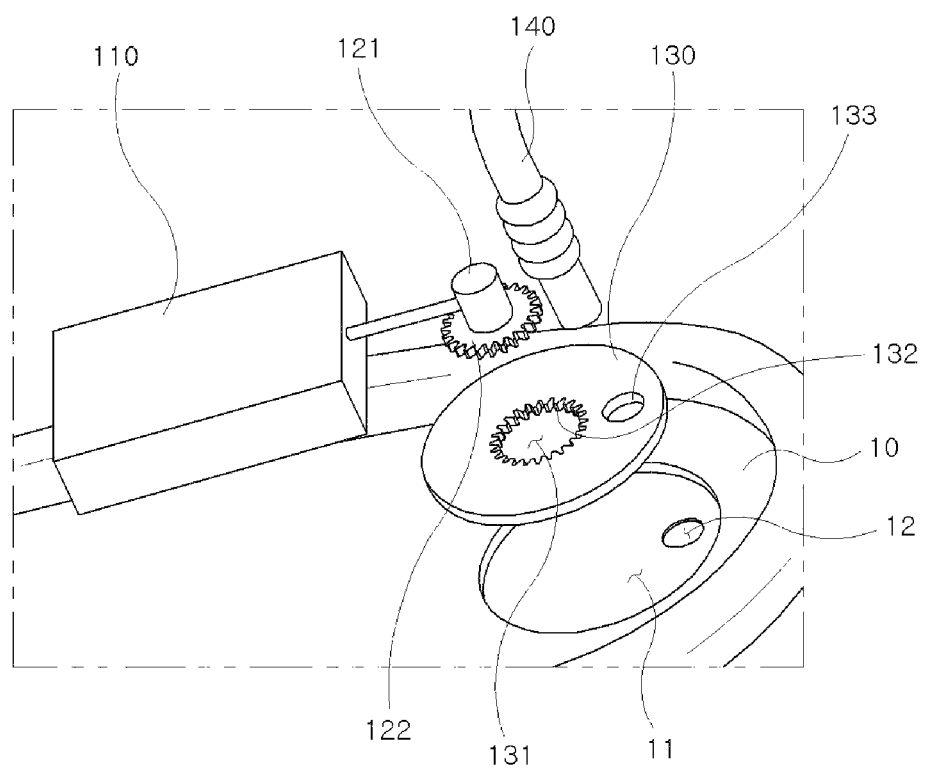
FIG. 4B is an exploded diagram illustrating the portion C.
Figure 5:
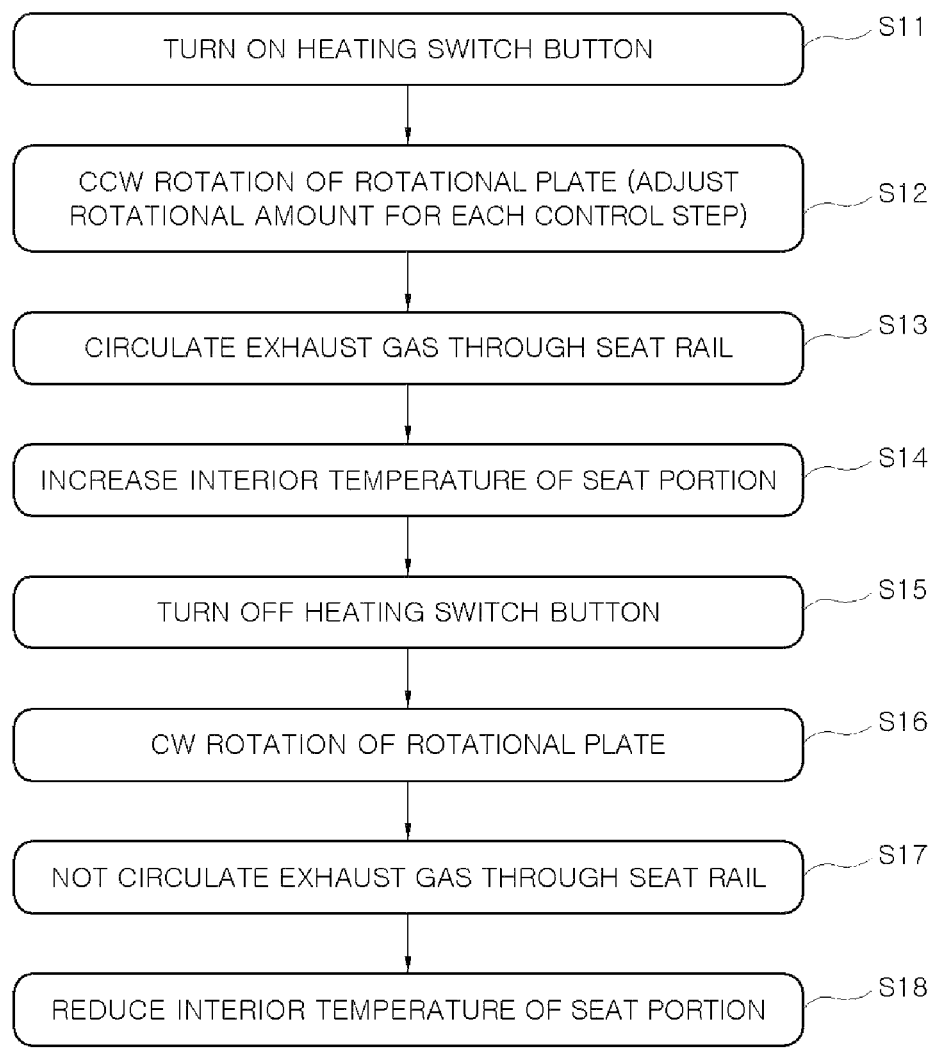
FIG. 5 is a diagram illustrating an operation order of the seat heating system according to the present disclosure.

FIG. 2A is an enlarged diagram illustrating a portion A illustrated in FIG. 1, FIG. 2B is a diagram illustrating a cross-sectional shape viewed from X illustrated in FIG. 2A, FIG. 3 is an enlarged diagram illustrating a portion B illustrated in FIG. 1, FIG. 4A is an enlarged diagram illustrating a portion C illustrated in FIG. 1, and FIG. 4B is an exploded diagram illustrating the portion C.

Hereinafter, a seat heating system for a vehicle according to an exemplary embodiment of the present disclosure will be described with reference to FIGS. 1 to 4B.

The seat heating system for a vehicle according to the present disclosure is a system capable of providing heating to a seat using waste heat of exhaust gas instead of the conventional hot wire mounted inside the seat.

To this end, the seat heating system includes an actuator motor 110, power transfer parts 121, 122, a rotational plate 130, an exhaust gas inlet tube 140, an exhaust gas outlet tube 150, a heat exchanging tube 160, and the like.

A seat for a vehicle is coupled to a seat rail 30 mounted on a vehicle body in the front and rear direction of a vehicle and configured to be movable in the front and rear direction of a vehicle along the seat rail 30

In addition, a pair of the seat rails 30 are mounted on each of locations corresponding to both side portions of the lower surface of the seat for a vehicle, respectively.

A cross section of a general seat rail has a solid form with a full interior, but as illustrated in FIG. 2B, the seat rail according to the present disclosure has a hollow structure with an empty interior such as a duct.

In addition, the heat exchanging tube 160 for connecting the pair of seat rails 30 is configured, thereby allowing a heat source to circulate through the seat rail 30 and the heat exchanging tube 160 to provide heating to the seat for a vehicle, so that it is possible to increase a heat dissipation area, thereby increasing heating efficiency.

The heat source supplied to the seat rail 30 and the heat exchanging tube 160 uses the exhaust gas of a vehicle, and to this end, the seat heating system includes the exhaust gas inlet tube 140 having one end communicating with a silencer hole 12 formed in a muffler silencer 10 and the other end connected to any one of a pair of the seat rails 30, and the exhaust gas outlet tube 150 having one end communicating with the outer surface of a muffler pipe 20 mounted on the rear end of the muffler silencer 10 and the other end connected to any one of the pair of seat rails 30, so that the exhaust gas is introduced into the seat rail 30 through the exhaust gas inlet tube 140 to circulate through the heat exchanging tube 160 and the seat rail 30 and then discharged to the muffler pipe 20 through the exhaust gas outlet tube 150.

As described later, the exhaust gas inlet tube 140 and the exhaust gas outlet tube 150 are more preferably connected to the same one of the pair of the seat rails 30 in consideration of the smooth circulation and efficiency of the exhaust gas.

In addition, a plurality of heat exchanging tubes 160 may be provided, and is more preferably provided with three or more heat exchanging tubes including a first heat exchanging tube 161, a second heat exchanging tube 162, and a third heat exchanging tube 163.

One end of the exhaust gas inlet tube 140 communicates with the silencer hole 12 formed in the muffler silencer 10, and the present disclosure may adjust the degree of the communication between the exhaust gas inlet tube 140 and the silencer hole 12 by a heating adjustment means, thereby adjusting the heating level.

The heating adjustment means includes the actuator motor 110, the power transfer parts, and the rotational plate 130.

The rear surface of the muffler silencer 10 is formed with a rotational plate seating groove 11, and the rotational plate 130 is seated in the rotational plate seating groove 11.

In addition, one end of the exhaust gas inlet tube 140 is configured to be coupled to penetrate the rotational plate hole 133 formed in the rotational plate 130 to communicate with the silencer hole 12.

Therefore, the seat heating system includes the actuator motor 110, a rod 121 as the power transfer part, and a gear 122 for adjusting the degree of the communication between the exhaust gas inlet tube 140 and the silencer hole 12, and performing the rotational operation of the rotational plate 130 by rotationally operating the rotational plate 130, and a gear coupling hole 131 is formed on the central portion of the rotational plate 130, and the inner diameter formed with the gear coupling hole 131 is formed with a rotational plate gear 132 engaged with the gear 122.

The actuator motor 110 transfers power to the gear 122 through the rod 121 so that the gear 122 is rotationally operated.

As the gear 122 is rotationally operated, the rotational plate gear 132 coupled to the gear is rotationally operated together.

As a result, the rotational plate 130 is rotationally operated on the rotational plate seating groove 11, and a location of the exhaust gas inlet tube 140 mounted on the rotational plate hole 133 is adjusted, so that the degree of the communication between the exhaust gas inlet tube 140 and the silencer hole 12 is adjusted.

Furthermore, in order to absorb the displacement due to the rotation of the rotational plate 130 of the exhaust gas inlet tube 140, it is preferable that the exhaust gas inlet tube 140 is partially formed with a wrinkle tube 131, and the wrinkle tube 131 is formed adjacent to the rotational plate 130.

That is, as illustrated, the exhaust gas inlet tube 140 is bent after extending from one end coupled to the rotational plate 130, and may be bent several times, and is formed with the wrinkle tube 131 adjacent to the rotational plate 130 before the bending portion, thereby facilitating a change in the location of the exhaust gas inlet tube 140.

In addition, as illustrated in FIG. 3, the exhaust gas outlet tube 150 may be formed with a wrinkle tube 151 adjacent to the muffler pipe 20 to absorb the movement of the muffler pipe 20, so that the exhaust gas outlet tube 150 is not largely moved.

Alternatively, the wrinkle tubes 141, 151 may be configured to be replaced with a rubber member.

Next, an operation order of the seat heating system according to the present disclosure will be described with reference to FIGS. 5, and 6A to 6D.

Figure 6A:
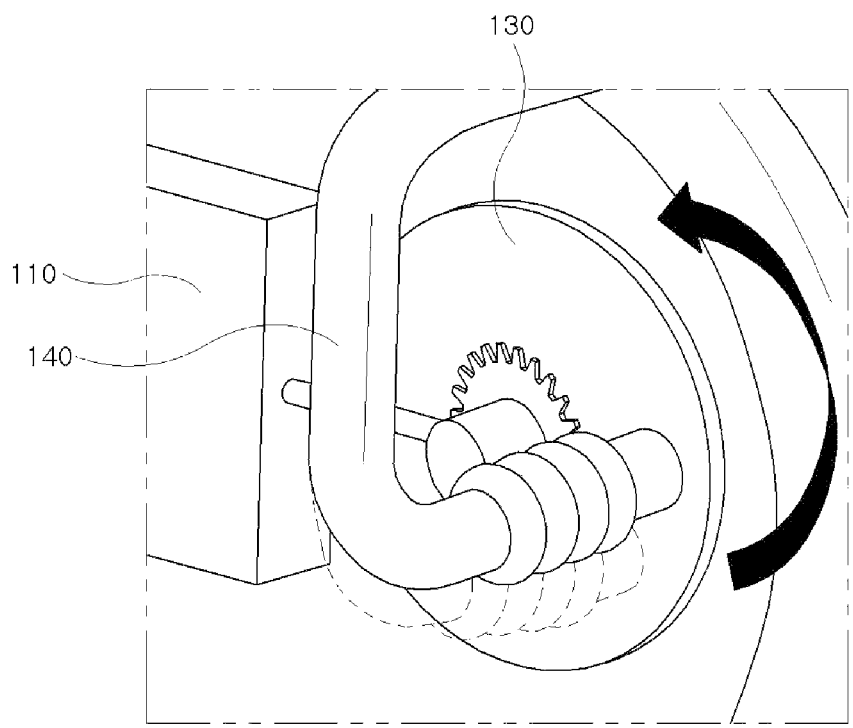
FIGS. 6A to 6D are diagrams illustrating operation states of the seat heating system according to the present disclosure.

When a heating switch disposed in a vehicle is turned on (S11), an operation signal is transferred to the actuator motor 110, and as illustrated in FIG. 6A, the rotational plate 130 is rotated by the operation of the actuator motor 110 (S12) in response to the received operation signal.

Figure 6B:
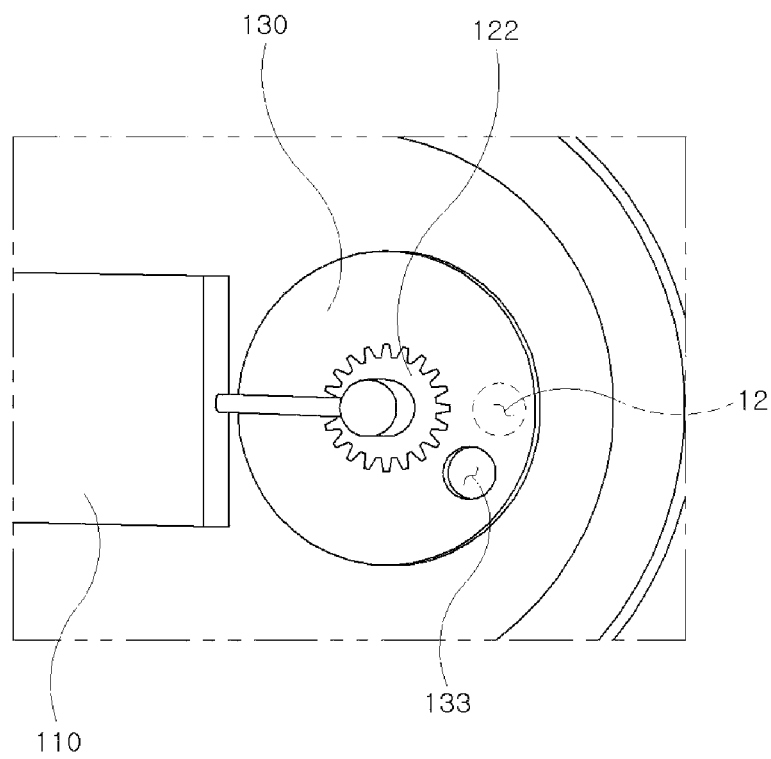

Before operating the heating system, as illustrated in FIG. 6B, the rotational plate hole 133 and silencer hole 12 do not communicate with each other at all so that the exhaust gas is not introduced through the exhaust gas inlet tube 140.

Figure 6C:
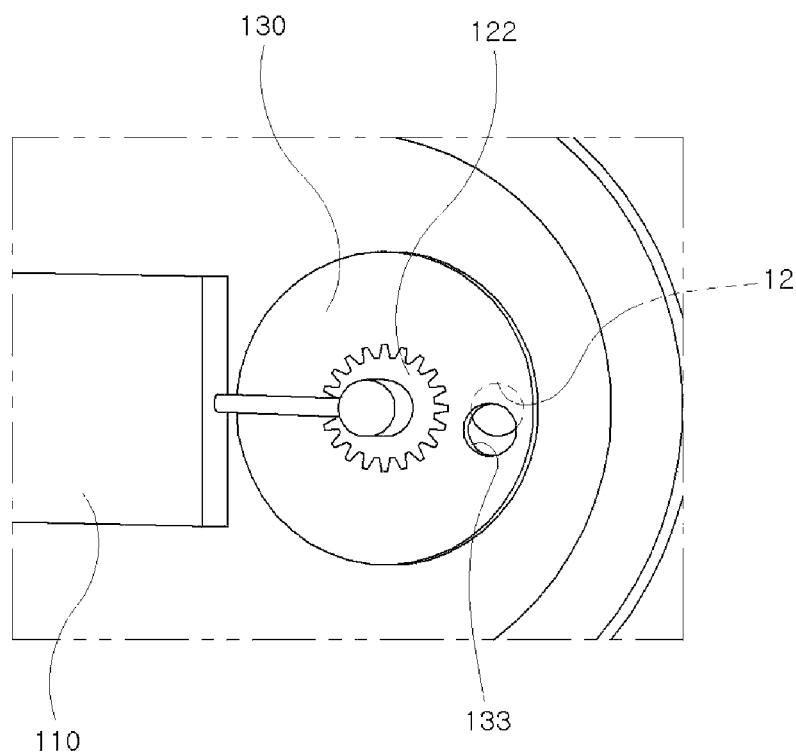

When the rotational plate 130 is rotated counterclockwise (CCW) by the operation S12, the rotational plate hole 133 and the silencer hole 12 communicate with each other, and when the rotational amount of the rotational plate is adjusted step by step for adjusting the heating level step by step, the adjustments in the step illustrated in FIG. 6C and the step illustrated in FIG. 6B are possible.

As another exemplary embodiment, it is possible to adjust a circulation area rather than the circulation amount adjustment of the exhaust gas, thereby adjusting the heating intensity.

That is, it is possible to individually control the opening and closing of the plurality of heat exchanging tubes, thereby adjusting the heating level.

Specifically, a first heating stage may allow the exhaust gas to circulate through only the first heat exchanging tube 161, a second heating stage may allow the exhaust gas to circulate by opening the first heat exchanging tube 161 and the second heat exchanging tube 162, and a third heating stage may allow the exhaust gas to circulate through all of the first heat exchanging tube 161, the second heat exchanging tube 162, and the third heat exchanging tube 163.

In an example, it has been described that the direction in which the rotational plate 130 is rotated counterclockwise is the direction of operating the heating system, and a direction opposite thereto may also be set.

Figure 6D:
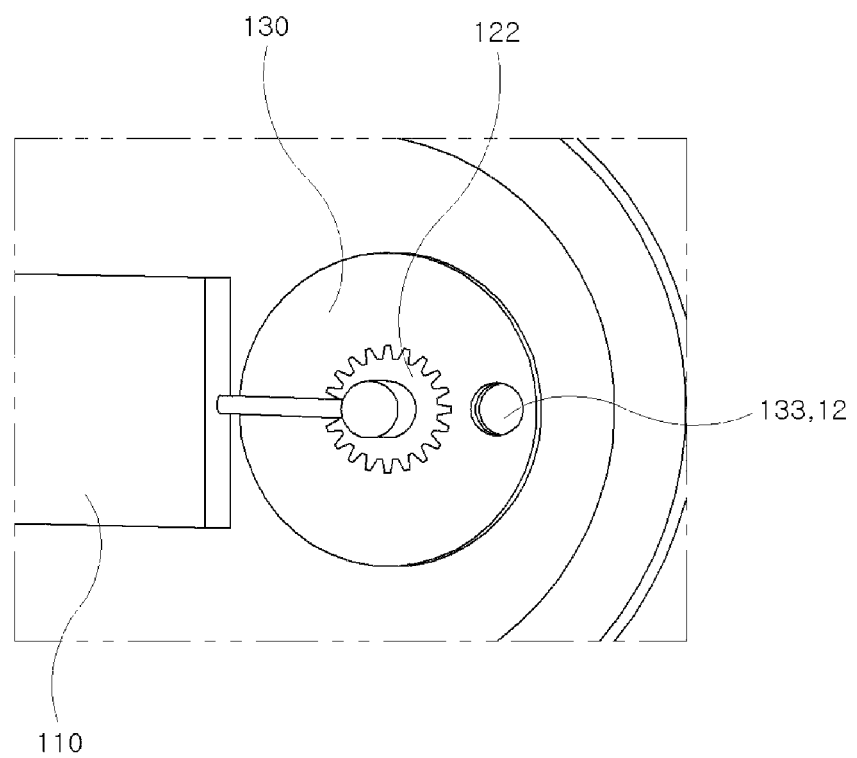
Figure 7A:
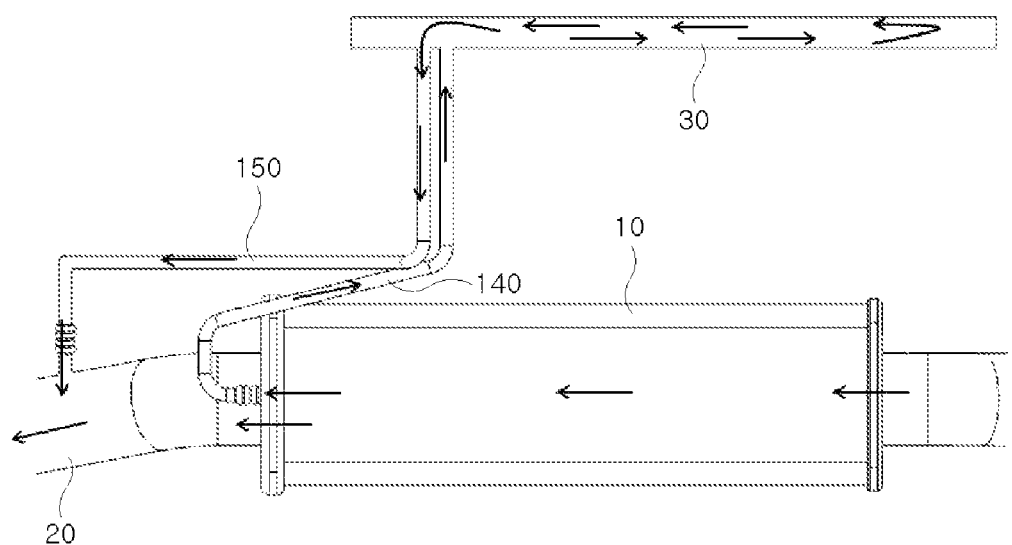
Figure 7B:
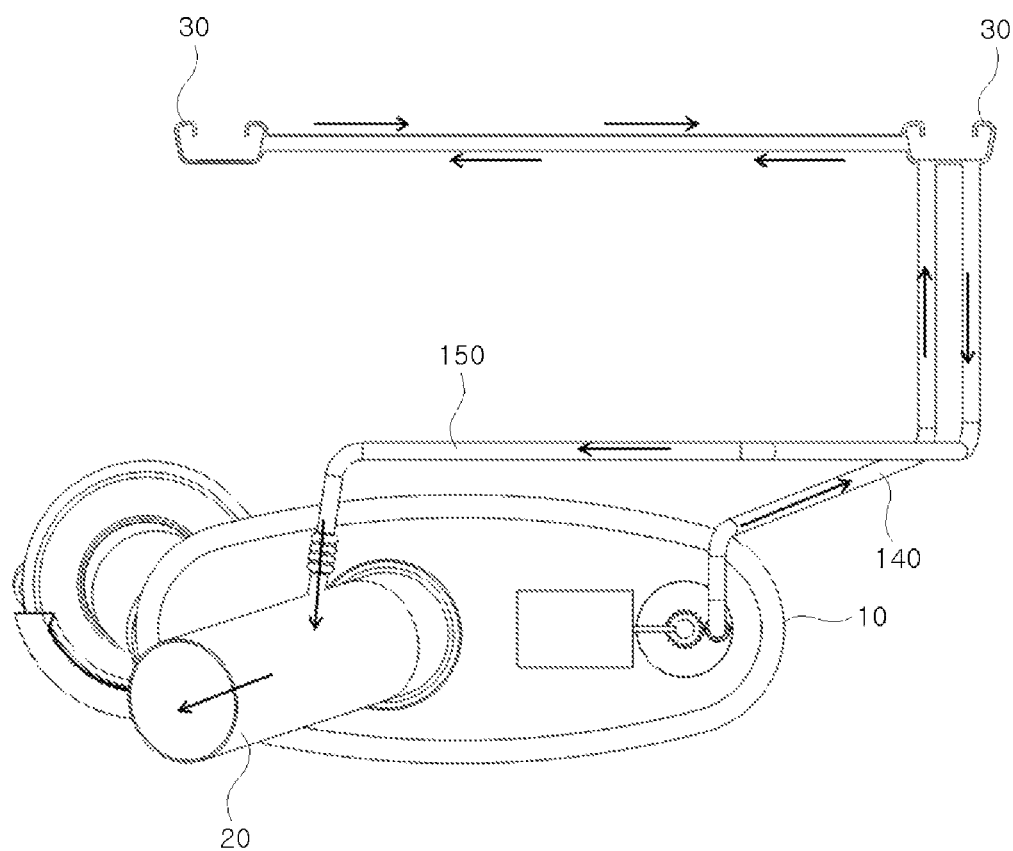
Figure 7C:
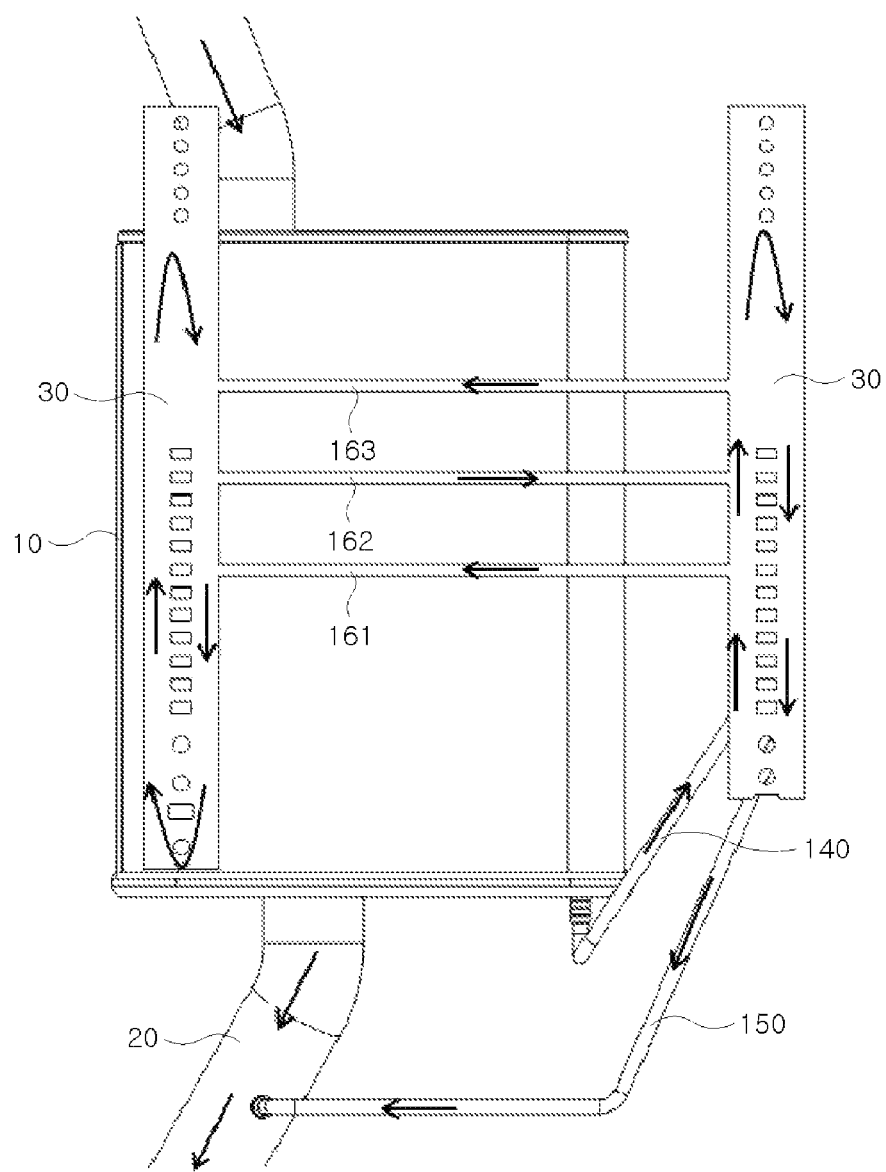

As described above, in the case of the state illustrated in FIG. 6C or FIG. 6D, the exhaust gas circulates through the exhaust gas seat rail 30 and the heat exchanging tube 160 through the exhaust gas inlet tube 140 like the flows illustrated in FIGS. 7A to 7C (S13), and the exhaust gas is discharged through the exhaust gas outlet tube 150 after the circulation, and the temperature of the seat portion of a vehicle is increased by such an operation (S14).

Thereafter, when the heating switch is turned off (S15), the operation signal is transferred to the actuator motor 110, and the rotational plate 130 is rotated clockwise by the operation of the actuator motor 110 (S16) in response to the received operation signal.

Then, returning back to the state illustrated in FIG. 6B, the exhaust gas becomes a state of being not circulated to the seat rail 130 (S17), thereby lowering the temperature of the seat portion of a vehicle (S18).

As described above, the seat heating system for a vehicle according to the present disclosure may not require the conventional hot wire seat, and provide the heating to the seat by the waste exhaust gas instead of the hot wire.

As described above, the present disclosure has been described with reference to the exemplary drawings, but is not limited to the described exemplary embodiments, and it will be apparent to those skilled in the art that the present disclosure may be variously modified and changed without departing from the spirit and scope of the present disclosure. Therefore, the modified examples or the changed examples should be included in the claims of the present disclosure, and the scope of the present disclosure should be construed based on the appended claims.

What is claimed is:

1. A seat heating system for a vehicle comprising:
    an exhaust gas inlet tube having one end communicating with a silencer hole in a muffler silencer, and the other end mounted on a vehicle body and connected to a first seat rail coupled to a seat; and
    an exhaust gas outlet tube having one end communicating with a muffler pipe of a rear end of the muffler silencer, and the other end connected to the first seat rail.

2. The seat heating system for a vehicle of claim 1, wherein the first seat rail has a hollow structure.

3. The seat heating system for a vehicle of claim 1, further comprising:
    a second seat rail; and
    a heat exchanging tube for connecting the first and second seat rails.

4. The seat heating system for a vehicle of claim 3, wherein a plurality of heat exchanging tubes are configured.

5. The seat heating system for a vehicle of claim 4, wherein openings and closings of the plurality of heat exchanging tubes are individually controlled.

6. The seat heating system for a vehicle of claim 1, further comprising: a rotational plate mounted on the muffler silencer, wherein the one end of the exhaust gas inlet tube is coupled through a rotational plate hole in the rotational plate to communicate with the silencer hole.

7. The seat heating system for a vehicle of claim 6, wherein a degree of the communication between the exhaust gas inlet tube and the silence hole is adjusted by a rotational operation of the rotational plate.

8. The seat heating system for a vehicle of claim 7, further comprising:
an actuator motor mounted on the muffler silencer; and
a power transfer part for transferring power by an operation of the actuator motor to the rotational plate.

9. The seat heating system for a vehicle of claim 8, wherein the power transfer part comprises:
a rod connected to the actuator motor; and
a gear coupled to an end of the rod, and
wherein the rotational plate is provided with a rotational plate gear engaged with the gear.

10. The seat heating system for a vehicle of claim 1, wherein the exhaust gas inlet tube and the exhaust gas outlet tube are partially provided with wrinkle tubes.

11. The seat heating system for a vehicle of claim 1, wherein the other end of the exhaust gas inlet tube is mounted on the vehicle body in a front and rear direction of the vehicle.

12. A seat heating system for a vehicle comprising:
an exhaust gas inlet tube having one end communicating with a silencer hole in a muffler silencer, and the other end mounted on a vehicle body and connected to a first seat rail coupled to a seat;
an exhaust gas outlet tube having one end communicating with a muffler pipe of a rear end of the muffler silencer, and the other end connected to the first seat rail; and
a heating adjustment structure for adjusting a degree of the communication between the exhaust gas inlet tube and the silencer hole.

13. The seat heating system for a vehicle of claim 12, wherein the heating adjustment structure comprises:
an actuator motor mounted on the muffler silencer;
a rotational plate mounted on the muffler silencer; and
a power transfer part for transferring power by an operation of the actuator motor to the rotational plate.

14. The seat heating system for a vehicle of claim 13, wherein the one end of the exhaust gas inlet tube is coupled through a rotational plate hole in the rotational plate to communicate with the silencer hole, and
wherein the degree of the communication between the exhaust gas inlet tube and the silencer hole is adjusted by a rotational operation of the rotational plate.

15. The seat heating system for a vehicle of claim 14, wherein the power transfer part comprises:
a rod connected to the actuator motor; and
a gear coupled to an end of the rod, and
wherein the rotational plate is provided with a rotational plate gear engaged with the gear.

16. The seat heating system for a vehicle of claim 12, further comprising:
a second seat rail; and
a heat exchanging tube for connecting the first and second seat rails.

17. The seat heating system for a vehicle of claim 16, wherein a plurality of heat exchanging tubes are configured.

18. The seat heating system for a vehicle of claim 12, wherein the other end of the exhaust gas inlet tube is mounted on the vehicle body in a front and rear direction of a vehicle.

* * * * *